Aug. 29, 1967  H. MAGI  3,338,545
MOUNTING APPARATUS FOR REAR VIEW MIRROR
Filed Aug. 30, 1965  2 Sheets-Sheet 1

INVENTOR.
Hugo Magi
BY
Attorney

United States Patent Office 3,338,545
Patented Aug. 29, 1967

3,338,545
MOUNTING APPARATUS FOR REAR VIEW MIRROR
Hugo Magi, Etobicoke, Ontario, Canada, assignor to Dominion Auto Accessories Limited, Toronto, Ontario, Canada
Filed Aug. 30, 1965, Ser. No. 483,459
9 Claims. (Cl. 248—481)

ABSTRACT OF THE DISCLOSURE

A mirror is supported in a housing that has a cup-shaped part formed integral therewith, the latter defining a chamber opening away from the mirror. A plate rests on a bearing surface of the housing surrounding the cup-shaped part. This plate together with another plate and a ball formed on a mirror assembly mounting arm form a ball and socket joint, the two plates being secured to the housing by fastening devices and sandwiching the ball therebetween.

---

This invention relates to a rear view mirror assembly.

Rear view mirror assemblies are commonly used in association with motor vehicles such as trucks and automobiles. In known rear view mirror assemblies quite often ball and socket type joints are provided for ready adjustment of the mirror and its housing. Some such assemblies have the bearing surface of the ball and socket joint formed in the housing which supports the mirror. Other assemblies have the bearing surface for the ball and socket joint permanently assembled and sometimes fixedly attached to the mirror housing by means of a welding, rivetting or soldering operation. In some such assemblies a plate engageable with fastening means such as screws is permanently fastened to the inside of the mirror housing adjacent the reflecting surface of the mirror. The screws extend through openings in the mirror housing to threadably engage the plate. Other assemblies do not have an additional part such as a plate, but the fastening means extend through the housing. During adjustment, or in the event that one of the fastening means becomes disengaged from the assembly, moisture can enter into the area behind and adjacent to the mirror. Such moisture can cause a discoloration of the reflecting surface of the mirror.

When the bearing surface of the ball and socket joint is formed in the housing, the bearing forces, being concentrated on this bearing surface, may cause the housing to be displaced inwardly tending to cause the mirror to be displaced from the housing.

In assemblies in which the ball and socket joint is permanently assembled and fixedly attached to the housing, if damage results to any party of the joint, the assembly is rendered inoperative, and the whole assembly, including the mirror and housing has to be replaced if any individual part has to be raplaced.

With respect to those rear view mirror assemblies that require rivetting, soldering and welding, it will be appreciated that these are separate operations in the manufacture of an assembly and, if possible, are to be avoided because of the consequent increase in the manufactured cost of the assembly.

Many known assemblies also require painting or other protective treatment of the housing to guard against corrosion or deterioration of the housing. Such further treatment also adds to the cost of manufacture of such an assembly.

A rear view mirror assembly embodying this invention does not require soldering, rivetting or welding operations to be carried out on the mirror housing for attaching fastening means thereto, since soldering, rivetting or welding operations are not required in the formation of the components of the ball and socket joint. The assembly of this invention is simple and relatively inexpensive to manufacture. Separate components of the assembly are individually replaceable. Through the particular construction of the mirror housing of the assembly of this invention and the manner of attaching the ball and socket joint thereto, moisture is unable to pass through the housing. Any tendency for the housing to deflect under the bearing pressure applied through the ball of the ball and socket joint is materially reduced because of the unique design of the ball and socket joint and its mode of attachment to the housing.

This invention will become more apparent from the following detailed description of a preferred embodiment of the invention taken in conjunction with the appended drawings, in which.

Figure 1:
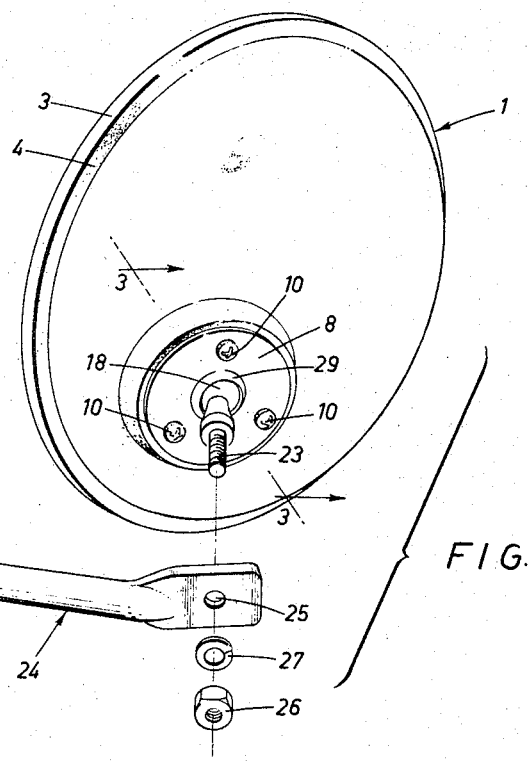
FIGURE 1 is a semi-exploded rear view of a mirror assembly embodying this invention.
Figure 2:
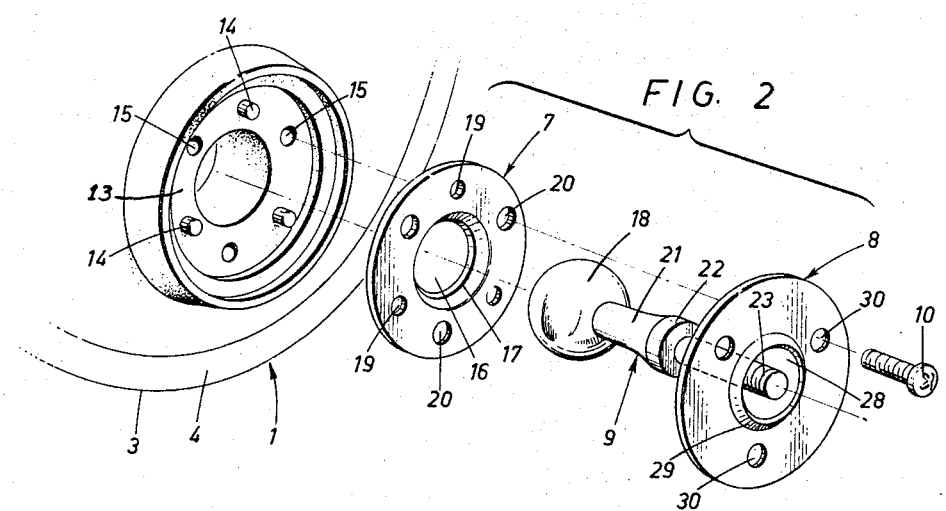
FIGURE 2 is an exploded view of the ball and socket joint of FIGURE 1 and shows a part of the mirror housing in greater detail.
Figure 3:
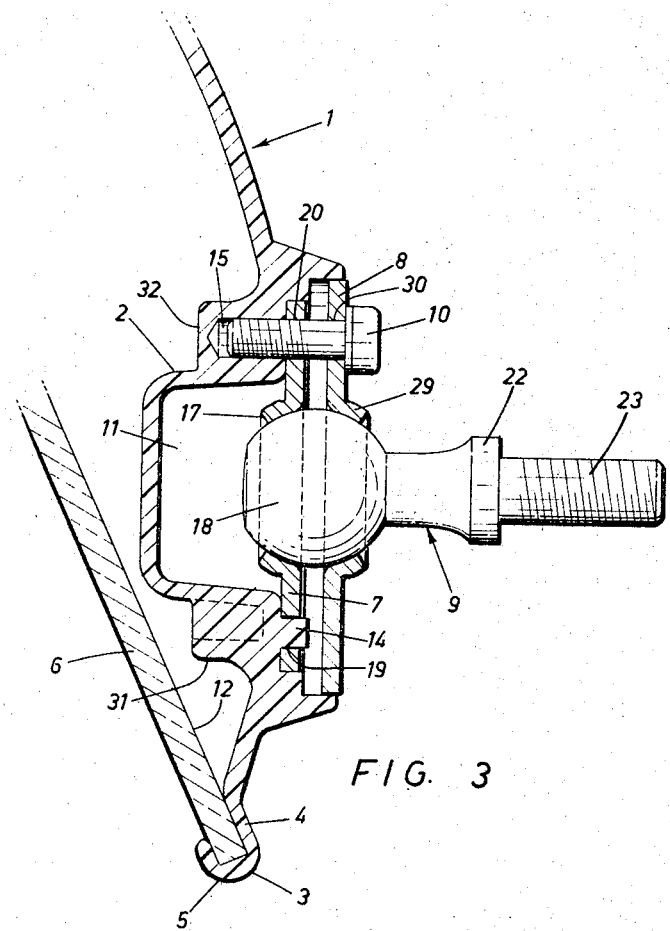
FIGURE 3 is a sectional view taken along line 3—3 of FIGURE 1.

Referring now to the drawings, a rear view mirror assembly embodying this invention comprises a housing 1, which may be circular in plan, and dished, and which has integrally formed therein a cup-shaped part 2. Also formed integrally with the housing 1 at its perimeter is a lip 3 having an essentially flat part 4 and a hook shaped part 5 which extends around the periphery of housing 1 and securely retains a circular mirror 6 within the housing, as best shown in FIGURE 3. There also is provided a ball and socket joint having a first or inner plate 7, a second or outer plate 8, a connection member 9 and fastening devices 10 in the form of screws.

Cup-shaped part 2 defines a chamber 11 which opens away from the reflecting surface 12 of mirror 6. Around cup-shaped part 2 is a bearing surface 13 with projections or pins 14 extending therefrom. Disposed opposite bearing surface 13 are a stress distributing annular rib 31 and radial ribs 32, all formed integrally with housing 1.

The inner plate 7 has a central opening 16 therein which is bounded by a part spherical bearing surface 17 spaced from housing 1 but in registry with chamber 11 and which receives and retains a substantially spherically shaped end 18 of connection member 9. Extending through the first plate 7 are spaced-apart holes 19 which align with pins 14 and spaced-apart holes 20 which align with openings 15 which receive screws 10. Openings 15 can either be threaded or formed to receive self-threading screws.

Connection member 9 has an essentially spherically shaped end 18, a neck portion 21 having a collar 22 and a threaded part 23. Collar 22 is adapted to abut against a surface of a mounting bracket 24, and threaded part 23 is adapted to pass through an opening 25 in bracket 24 and to threadably engage with a nut 26. A locking device such as lock washer 27 is adapted to fit over threaded part 23 and abut against bracket 24 between nut 26 and bracket 24.

Outer plate 8 has a central opening 28 therein which is bounded by a part spherical bearing surface 29 that is aligned with bearing surface 17 and which provides a seat for the essentially spherical shaped end 18 of connection member 9. Extending through outer plate 8 are holes 30 aligned with holes 20 and openings 15. Screws 10 are adapted to extend through holes 30 and holes 20 and securely engage the sides of openings 15.

In this embodiment of the invention housing 1 is formed of any suitable material such as a plastic. Cup-shaped part 2, stress distributing reinforcing ribs 31 and 32, bearing surface 13 and pins 14 are all integrally formed with the housing 1 in a single moulding operation.

Plates 7 and 8 and connection member 9 are all separately formed of any suitable material such as corrosion resistant metal and can be individually replaced if defective or damaged.

The rear view mirror assembly hereinbefore described is easily assembled by first placing plate 7 against bearing surface 13 with pins 14 extending through holes 19. The end part 18 of connection member 9 then is seated against bearing surface 17. Plate 8 is placed over the portion of end part 18 of connection member 9 remote from bearing surface 17 with the circular threaded part 23 of connection member 9 extending through opening 28 in plate 8. Bearing surface 29 of plate 8 seats against end part 18, as best shown in FIGURE 3. Screws 10 then are inserted through holes 30 and 20 and screwed into openings 15. Threaded part 23 of connection member 9 now may be inserted through hole 25 in bracket 24 and lock washer 27 placed around threaded part 23. Nut 26 is screwed on threaded portion 23 and tightened to forcibly abut lock washer 27 against one side of bracket 24 and collar 22 of connection member 9 against the other side of bracket 24. Housing 1 now may be adjusted into the desired position and screws 10 then firmly tightened, thereby sandwiching end 18 tightly between plates 7 and 8 to retain housing 1 in a fixed position. When screws 10 are tightened housing 1 will remain fixed in position when subjected to reasonable vibration. During assembly screws 10 may be sufficiently tightened to retain housing 1 fixed in position when subjected to vibration but capable of adjustment, without the necessity of loosening screws 10, upon the application of a reasonable force to housing 1. A motor vehicle operator can thereby readily adjust the assembly to meet his particular requirements.

End 18 of connection member 9 is retained spaced apart from and out of engagement with housing 1 because of the arrangement of bearing surface 17 over chamber 11. As plate 8 is forced against end 18 by the tightening of screws 10, end 18 is forced against bearing surface 17. The force created by the tightening of fastening devices 10 is transmitted to housing 1 through plate 7 over bearing surface 13 and through the stress distributing reinforcing ribs 31 and 32. The substantial area of bearing surface 13 evenly distributes the force, and the rigidity of ribs 31 and 32 assists in preventing substantial deflection of housing 1 as screws 10 are tightened or force is otherwise applied to connection member 9. Thus the assembly absorbs and distributes forces to which it is subjected so that mirror 6 is kept retained within housing 1. At the same time, there are no openings through housing 1 through which moisture can enter, and the position of the mirror can be adjusted quickly and easily.

It will be appreciated by those skilled in the art that this invention can be embodied in many forms without departing from the essential characteristics thereof. This present embodiment is therefore illustrative and not restrictive and the scope of the invention is defined by the appended claims.

What I claim is:

1. A rear view mirror assembly comprising a mirror having a reflecting surface, a housing supporting said mirror and enclosing the reflecting surface of said mirror, said housing having a cup-shaped part formed integral therewith, said cup-shaped part having a bottom and side walls defining a chamber opening away from said mirror, the part of said housing surrounding said cup-shaped part forming a first bearing surface, a first plate resting on said first bearing surface and having a depression therein forming a second bearing surface spaced-apart from said bottom and in alignment with said chamber, said first plate having a plurality of spaced-apart openings extending therethrough, a second plate having a first opening extending therethrough in alignment with said second bearing surface and having a plurality of spaced-apart openings extending therethrough, a member extending through said first opening and having a part thereof sandwiched between said plates and seated on said second bearing surface, said member being spaced from and out of direct engagement with said housing, fastening devices extending through at least some of said spaced-apart openings and engaging said housing, said fastening devices upon tightening thereof being adapted to sandwich said part of said member tightly between said plates to maintain the position of said member fixed with respect to said plates, the force exerted by said part of said member against said second bearing surface when said fastening means are tightened being transmitted to said housing over said first bearing surface, said member and said first and second plates being readily removable from said housing when said fastening devices are disengaged from said housing.

2. A rear view mirror assembly according to claim 1 in which said fastening devices extending through at least some of said spaced-apart openings and engaging said housing extend only part way through said housing.

3. A rear view mirror assembly according to claim 2 wherein said housing is formed from a plastic.

4. A rear view mirror assembly according to claim 2 having reinforcing members formed integrally with said housing and disposed opposite to said first bearing surface.

5. A rear view mirror assembly according to claim 4 in which said reinforcing members include ribs extending radially from said cup-shaped part and an annular rib surrounding said cup-shaped part and formed integral with said ribs extending radially from said cup-shaped part.

6. A rear view mirror assembly according to claim 2 wherein said fastening devices engage said housing through said first bearing surface.

7. A rear view mirror assembly according to claim 2 wherein said first and second plates and said part of said member constitute a ball and socket joint.

8. A rear view mirror assembly according to claim 7 having reinforcing members formed integrally with said housing and disposed opposite to said first bearing surface.

9. A rear view mirror assembly according to claim 8 including spaced-apart pins projecting from said first bearing surface and extending into other ones of said spaced-apart openings in said first plate.

References Cited

UNITED STATES PATENTS

| 1,764,721 | 6/1930 | Hayden | 248—181 X |
| 2,615,368 | 10/1952 | Bindley | 248—481 |
| 2,968,995 | 1/1961 | Holden | 248—481 X |

ROY D. FRAZIER, *Primary Examiner.*

JOHN PETO, *Examiner.*